(12) United States Patent
Ho

(10) Patent No.: US 7,828,449 B2
(45) Date of Patent: Nov. 9, 2010

(54) ADJUSTING MECHANISM OF LIGHT INTEGRATION ROD MODULE, OPTICAL ENGINE AND PROJECTION APPARATUS

(75) Inventor: Wen-Ching Ho, Hsinchu (TW)

(73) Assignee: Coretronic Corporation, Hsinchu (TW)

( * ) Notice: Subject to any disclaimer, the term of this patent is extended or adjusted under 35 U.S.C. 154(b) by 526 days.

(21) Appl. No.: 11/958,359

(22) Filed: Dec. 17, 2007

(65) Prior Publication Data

US 2009/0015802 A1    Jan. 15, 2009

(30) Foreign Application Priority Data

Jul. 9, 2007    (TW) .............................. 96124877 A

(51) Int. Cl.
*G03B 21/14* (2006.01)
(52) U.S. Cl. .................... 353/102; 353/97; 353/122; 353/112; 353/31; 353/37; 362/616; 362/615

(58) Field of Classification Search .................. 353/97, 353/102, 122, 53, 98–100, 112, 31, 119, 353/133; 362/615, 616
See application file for complete search history.

(56) References Cited

U.S. PATENT DOCUMENTS 7,717,572 B2 * 5/2010 Hsu et al. ..................... 353/97

\* cited by examiner

*Primary Examiner*—Tony Ko
(74) *Attorney, Agent, or Firm*—Jianq Chyun IP Office

(57) ABSTRACT

An adjusting mechanism for a rod module adapted to an optical engine is provided. The adjusting mechanism utilizes two wedge-shaped blocks moving in perpendicular directions so as to convert the vertical adjustment of horizontal adjusting component into horizontal adjustment of an LIR module. Therefore, operators may adjust the horizontal and vertical position of the rod module from the same side of the projector, thus increasing the convenience in adjusting the position of the rod module.

16 Claims, 9 Drawing Sheets

ADJUSTING MECHANISM OF LIGHT INTEGRATION ROD MODULE, OPTICAL ENGINE AND PROJECTION APPARATUS

CROSS-REFERENCE TO RELATED APPLICATION

This application claims the priority benefit of Taiwan application serial no. 96124877, filed on Jul. 9, 2007. The entirety of the above-mentioned patent application is hereby incorporated by reference herein and made a part of this specification.

BACKGROUND OF THE INVENTION

1. Field of the Invention

The present invention generally relates to an adjusting mechanism, and more particularly, to an adjusting mechanism capable of adjusting the horizontal position and the vertical position of a light integration rod module (LIR module) from the same side of an optical engine.

2. Description of Related Art

Along with the modern video technology progress, optical projection apparatuses have been broadly used in various circumstances, such as home theater, small conference and addressing, or seminar. An optical projection apparatus includes an optical engine and a projection lens, wherein the optical engine is for providing an image beam and the projection lens is for projecting the image beam onto a screen. In addition, the optical engine usually includes a light source, an LIR module and a light valve. The light source is for producing a light beam, the LIR module is for homogenizing the light beam, and the light valve is for converting the light beam into the image beam.

In general speaking, the extent of homogenizing a light beam depends on the position where the light beam passes through the LIR of the LIR module. Accordingly, the LIR module usually has an adjusting unit for adjusting the position where the light beam is incident into a condenser lens after the light beam passes through the LIR, so that the light beam is preferably homogenized after departing from the LIR.

FIGS. 1A, 1B and 1C are diagrams respectively showing a top view, a bottom view and a sectional drawing of a conventional adjusting mechanism of the LIR module. Referring to FIGS. 1A, 1B and 1C, an optical engine 100 has an engine base 110 and a rod holder flat spring 120 fixed on the engine base 110. The engine base 110 has a first side wall 112 and a second side wall 114 adjacent to the first side wall 112. The rod holder flat spring 120 has a third side wall 122 and a fourth side wall 124 adjacent to the third side wall 122. The first side wall 112, the second side wall 114, the third side wall 122 and the fourth side wall 124 come together to form an accommodating space S for placing an LIR module 130 therein. In addition, a first spring portion 122a and a second spring portion 124a are respectively disposed on the third side wall 122 and the fourth side wall 124 to correspondingly provide an upward elastic force and a downward elastic force.

The LIR module 130 leans on a first spring portion 122a and a second spring portion 124a. The adjusting mechanism of the LIR module 130 includes a first adjusting screw 142 and a second adjusting screw 144 for respectively adjusting the positions of the LIR module 130 in a first axis (horizontal) and a second axis (vertical). The first adjusting screw 142 passes through the first side wall 112 of the engine base 110 to lean against the LIR module 130 so as to compress the second spring portion 124a to a desired extent by turning the first adjusting screw 142 and to furthermore adjust the relative position between the LIR module 130 and the rod holder flat spring 120 in the first axis. In the same way, the second adjusting screw 144 passes through the second side wall 114 of the engine base 110 to lean against the LIR module 130 so as to compress the first spring portion 122a to a desired extent by screwing the second adjusting screw 144 and to furthermore adjust the relative position between the LIR module 130 and the rod holder flat spring 120 in the second axis.

After the above-mentioned optical engine 100 has been assembled into a projector, a user is more convenient to turn the second adjusting screw 144 over the projector for further adjusting the vertical position of the LIR module 130. On the other hand however, the user does not easily manipulate a screw driver in the horizontal direction. Thus, the operator may need to take the whole projector apart so as to adjust the first adjusting screw 142 by turning and to furthermore adjust the horizontal position of the LIR module 130, which however would increase the difficulty of adjusting the position of the LIR module 130 and lengthen the operation time.

SUMMARY OF THE INVENTION

Accordingly, the present invention is directed to an adjusting mechanism adapted to an optical engine. The adjusting mechanism uses two wedge blocks associated with each other to convert the vertical adjustment of horizontal adjusting component into horizontal adjustment of an LIR module, so that a horizontal adjusting component and a vertical adjusting component are disposed in a same axis direction, which increases the convenience of adjusting both the horizontal position and the vertical position of the LIR module.

An embodiment of the present invention provides an adjusting mechanism adapted for an optical engine. The optical engine has an engine base, an LIR module and a rod holder flat spring, wherein the engine base has a first side wall and a second side wall adjacent to the first side wall, and the rod holder flat spring has a third side wall and a fourth side wall adjacent to the third side wall. The above-mentioned first side wall, second side wall, third side wall and fourth side wall form an accommodating space for placing an LIR module. In addition, a first spring portion and a second spring portion are respectively disposed on the third side wall and the fourth side wall. The adjusting mechanism includes a first adjusting unit and a second adjusting unit adapted for adjusting the relative positions between the LIR module and the rod holder flat spring in a first axis and a second axis substantially perpendicular to the first axis. The first adjusting unit passes through the first side wall of the engine base and adjustably pushes the LIR module for adjusting the relative positions between the LIR module and the rod holder flat spring in the first axis. The second adjusting unit mainly includes a fixed base, a first wedge block and a second wedge block. The fixed base is fixed on the engine base and has a first position-limiting groove and a second position-limiting groove connected to the first position-limiting groove. The first wedge block is slideably-disposed in the first position-limiting groove of the fixed base and capable of moving along the first axis; the second wedge block is slideably disposed in the fixed base, wherein the first wedge block is adapted for pushing the second wedge block to move in the second position-limiting groove along the second axis, and the second wedge block is adapted for pushing the LIR module to adjust the relative position between the LIR module and the rod holder flat spring in the second axis.

The adjusting mechanism of the LIR module of the present invention utilizes two wedge blocks moving in perpendicular directions to convert the vertical adjustment of horizontal adjusting component into horizontal adjustment of an LIR module. In this way, an operator may adjust the horizontal position and the vertical position of the LIR module from the same side of the projection apparatus, which increases the convenience of adjusting both the horizontal position and the vertical position of the LIR module.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
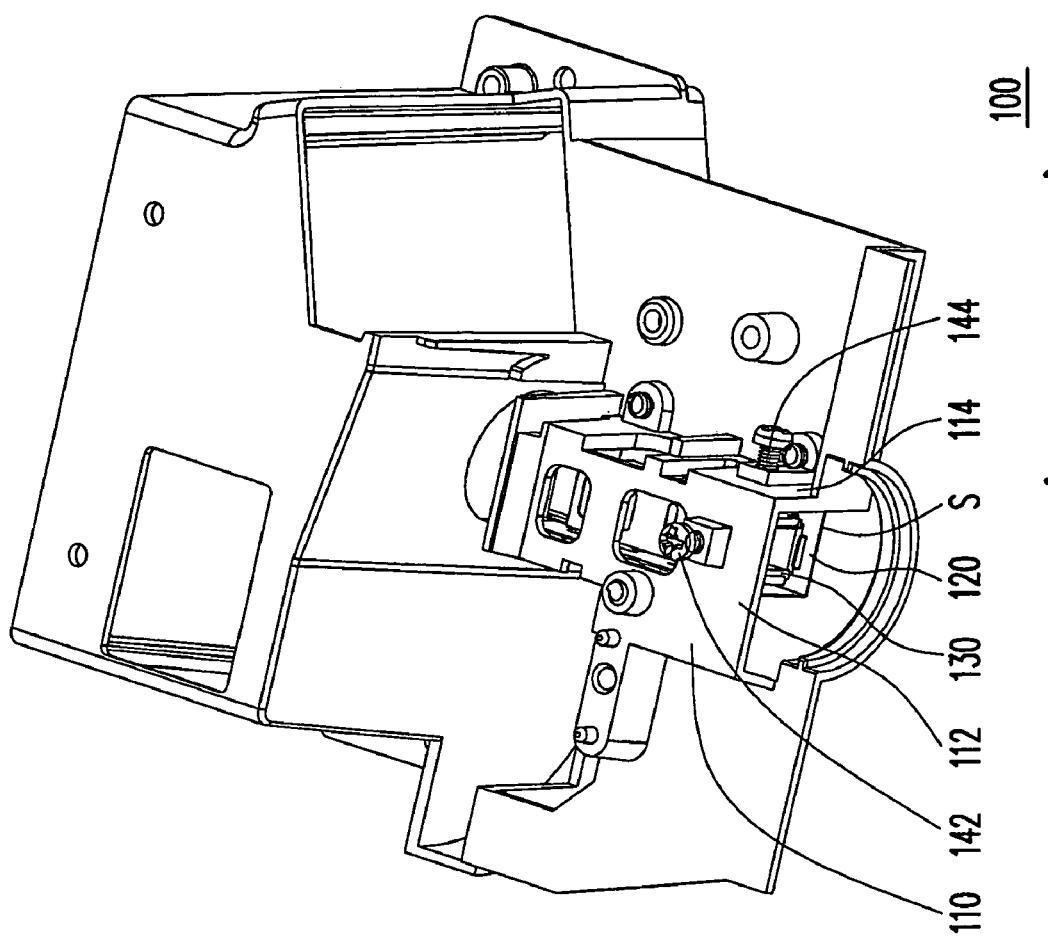
FIGS. 1A, 1B and 1C are diagrams respectively showing a 3D-top view, a 3D-bottom view and a sectional drawing of a conventional adjusting mechanism.
Figure 1B:
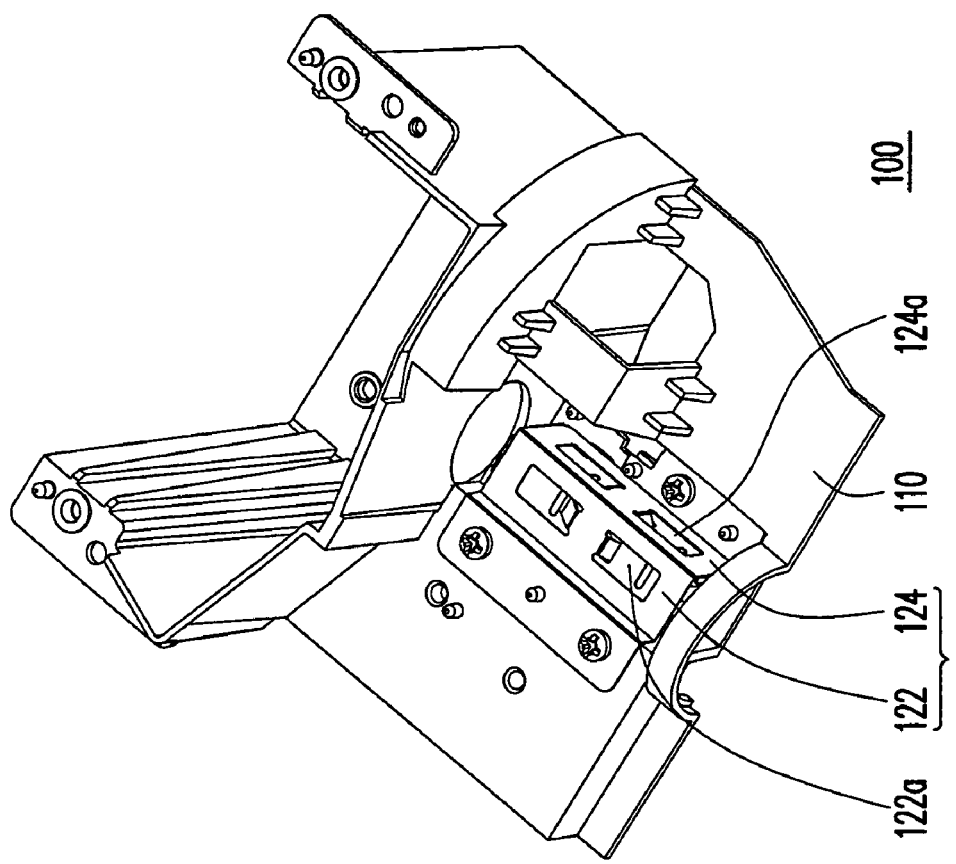
Figure 1C:
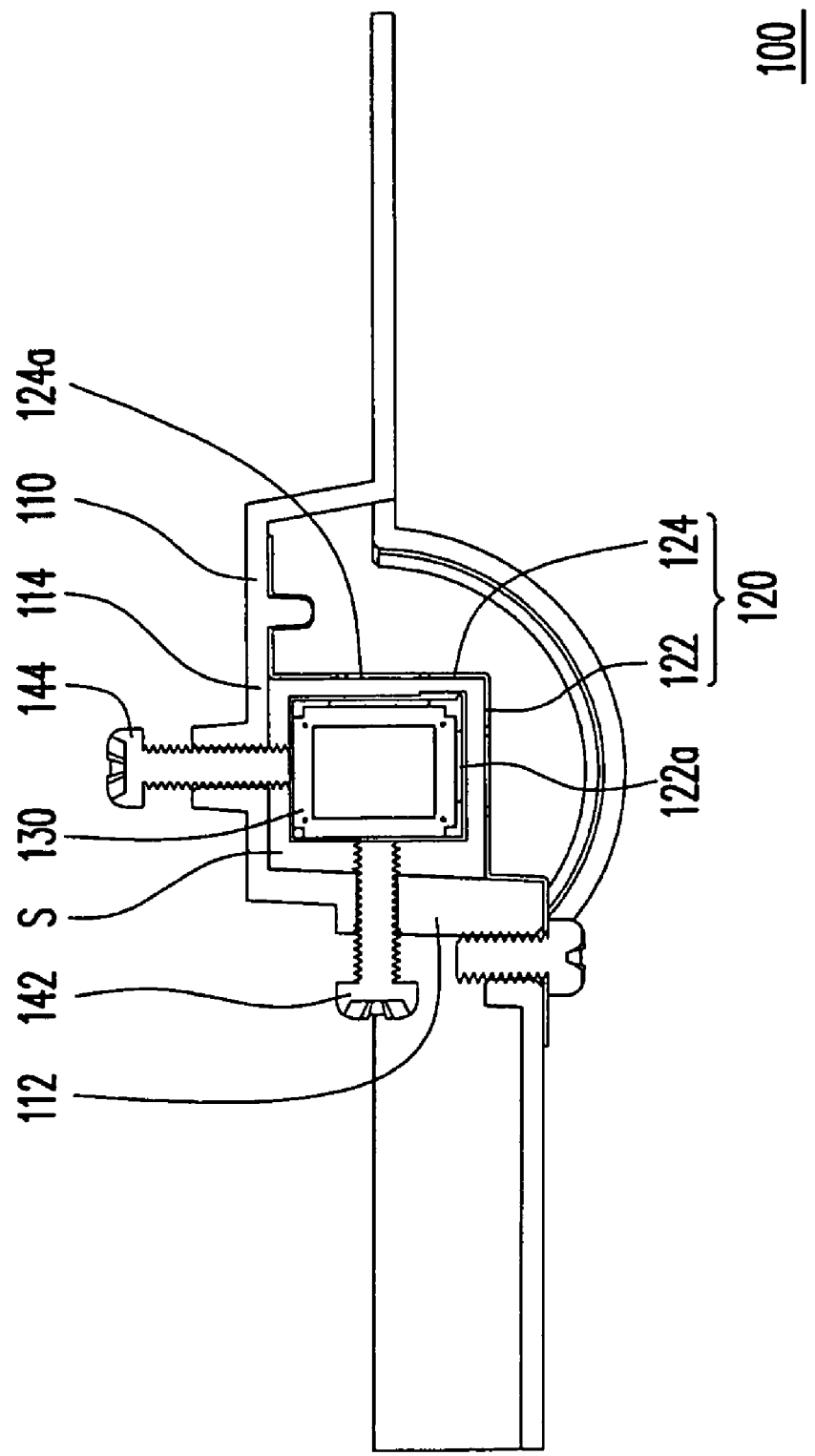

Reference will now be made in detail to the present preferred embodiments of the invention, examples of which are illustrated in the accompanying drawings. Wherever possible, the same reference numbers are used in the drawings and the description to refer to the same or like parts.

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein are meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 2A:
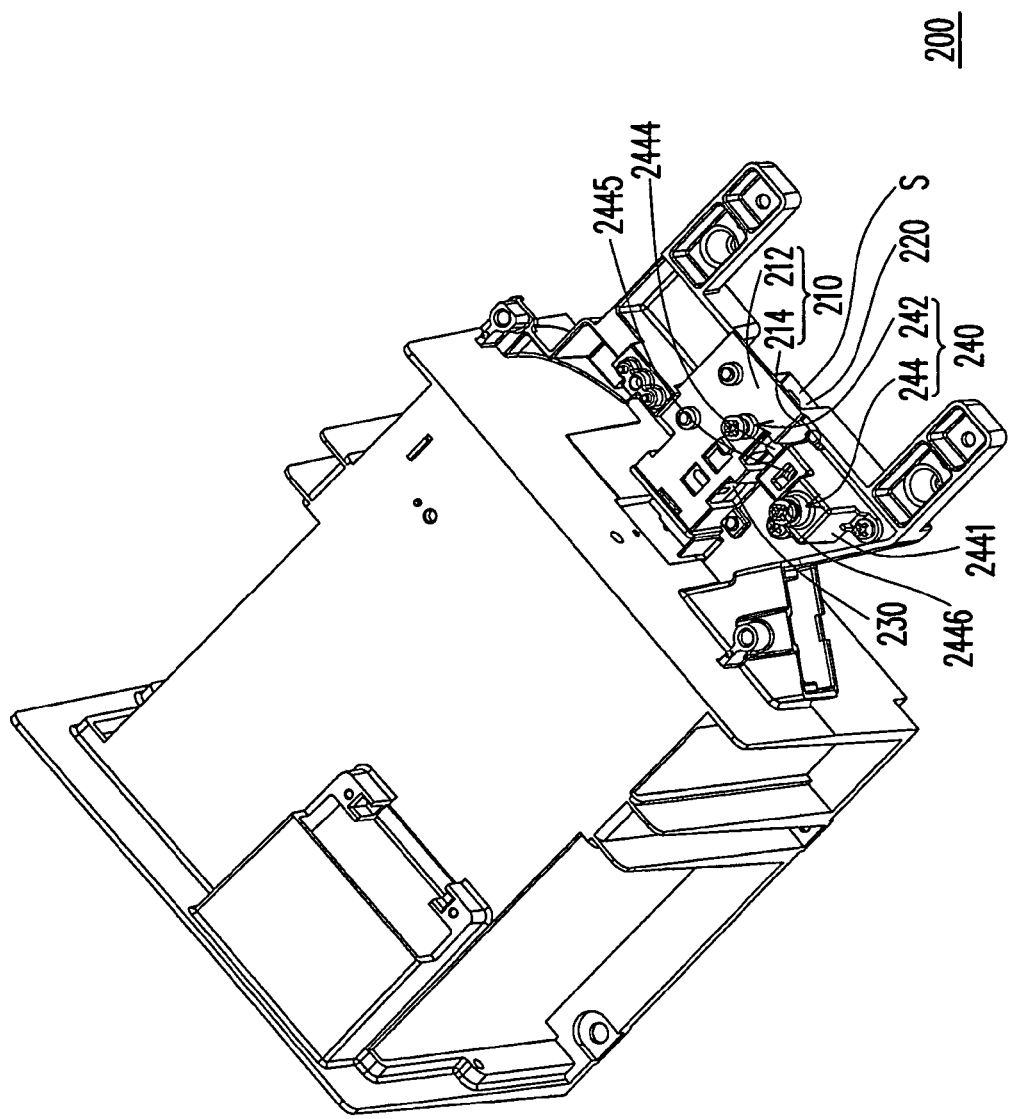
FIGS. 2A, 2B and 2C are diagrams respectively showing a 3D-top view, a 3D-bottom view and a sectional drawing of a light engine of the present invention.
Figure 2B:
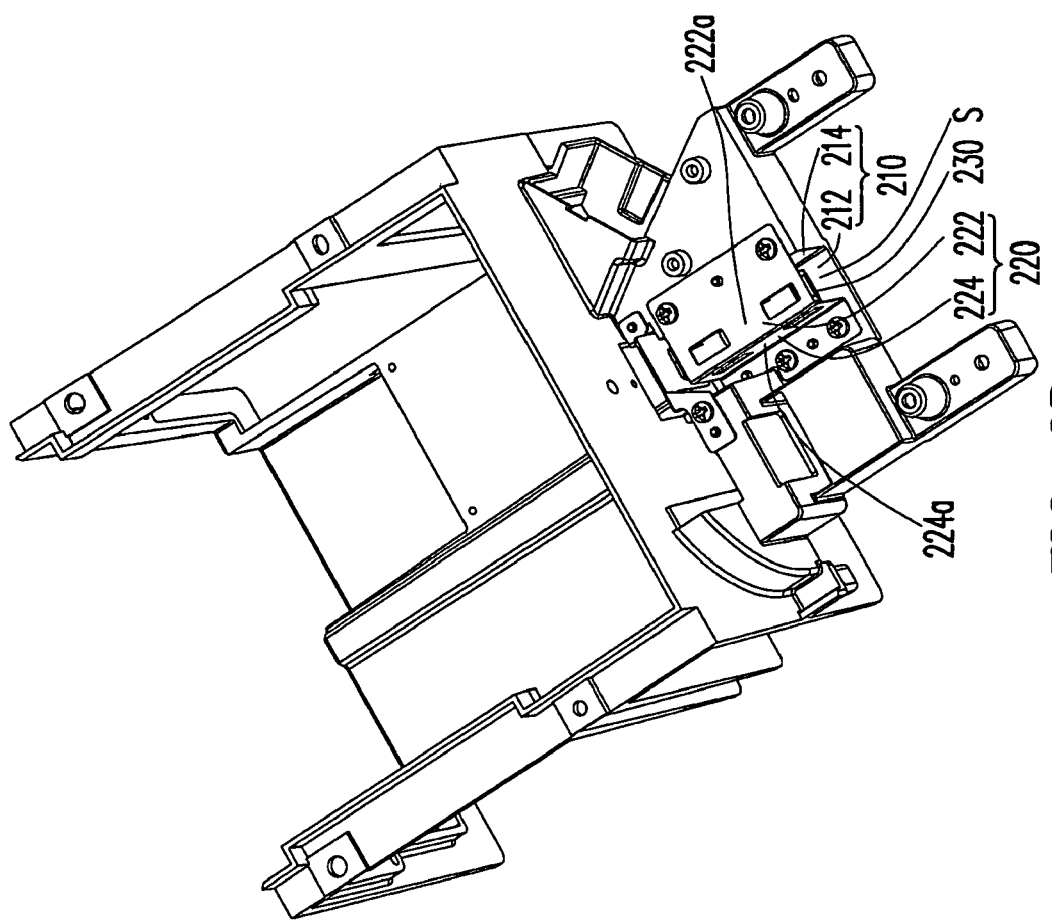
Figure 2C:
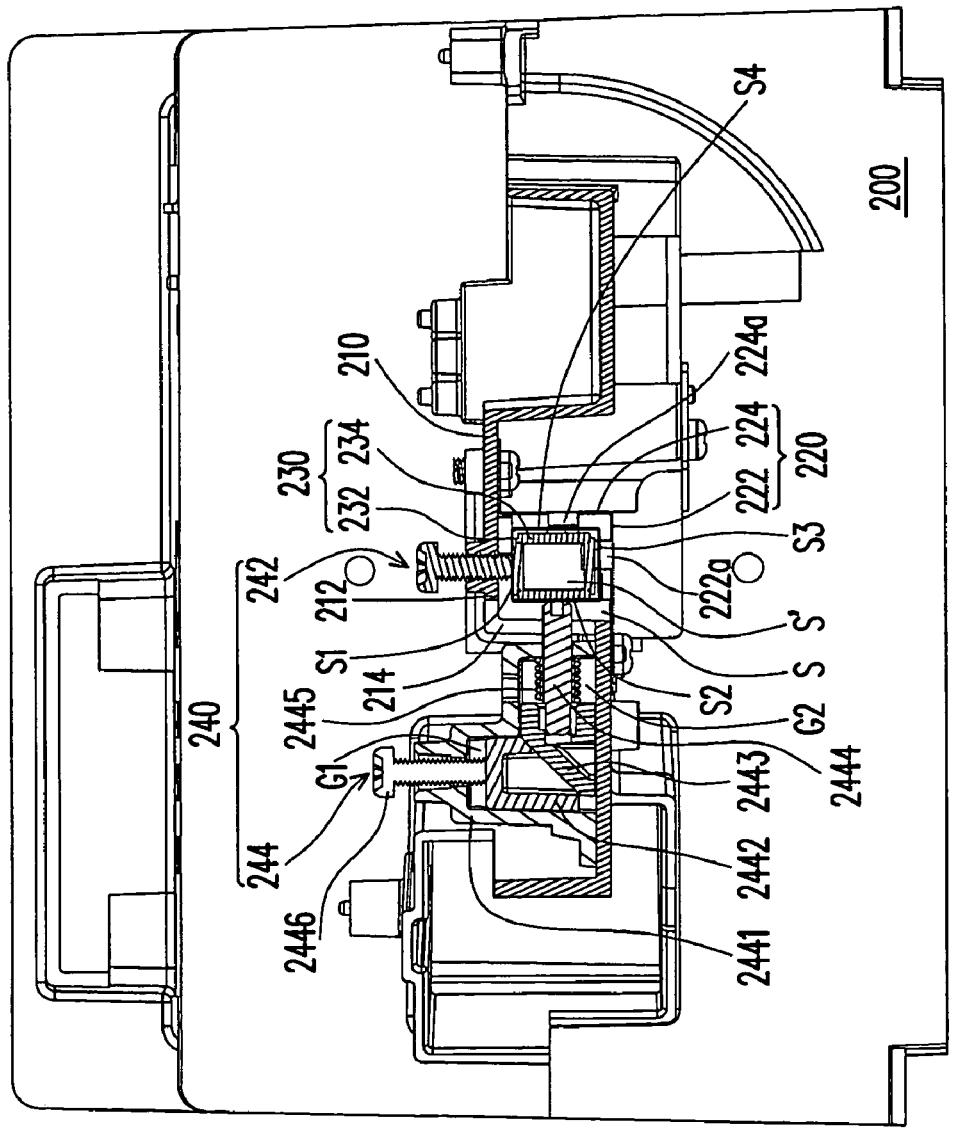

FIGS. 2A, 2B and 2C are diagrams respectively showing a 3D-top view, a 3D-bottom view and a sectional drawing of a light engine of the present invention. Referring to FIGS. 2A, 2B and 2C, the optical engine 200 of the present invention mainly includes a light source (not shown), an engine base 210, a rod holder flat spring 220, an LIR module 230, an adjusting mechanism 240 and an light valve (not shown). In the following, each component included by the optical engine of the present invention and the connections between the components are depicted in association with the referring figures.

The light source provides a light beam which enters into the LIR module 230 so as to be homogenized by the LIR module 230. The engine base 210 has a first side wall 212 and a second side wall 214 adjacent to the first side wall 212. The first side wall 212 and the second side wall 214 are substantially perpendicular to each other. The rod holder flat spring 220 is fixed on the engine base 210 and has a third side wall 222 and a fourth side wall 224 adjacent to the third side wall 222. The first side wall 212, the second side wall 214, the third side wall 222 and the fourth side wall 224 come together to form an accommodating space S for placing the LIR module 230 therein. In addition, a first spring portion 222a and a second spring portion 224a are respectively disposed on the third side wall 222 and the fourth side wall 224 of the rod holder flat spring 220. In the embodiment, the rod holder flat spring 220 is fixed on the engine base 210 by using screws.

The LIR module 230 is disposed in the accommodating space S and has a first surface S1, a second surface S2, a third surface S3 and a fourth surface S4, wherein the third surface S3 and the fourth surface S4 respectively lean on the first spring portion 222a and the second spring portion 224a. In more detail, the LIR module 230 has a frame 232 and an LIR 234, wherein the frame 232 has an accommodating space S' for receiving the LIR 234.

The adjusting mechanism 240 is suitable for adjusting the relative position between the LIR module 230 and the rod holder flat spring 220. The adjusting mechanism 240 includes a first adjusting unit 242 and a second adjusting unit 244 for respectively adjusting the relative positions between the LIR module 230 and the rod holder flat spring 220 in a first axis and a second axis substantially perpendicular to the first axis. In the present invention, the first adjusting unit 242 and the second adjusting unit 244 are mainly assembled on the engine base 210 along a same direction, so that when it is needed to adjust the horizontal position or the vertical position of the LIR module 230, according to an embodiment of the present invention, it is operable to conduct the adjusting from a same side of the optical engine 200 to increase the operation convenience.

The first adjusting unit 242 is for adjusting the relative positions between the LIR module 230 and the rod holder flat spring 220 in the first axis. The first adjusting unit 242 passes through the first side wall 212 of the engine base 210 and leans against the first surface S1 of the LIR module 230. The first adjusting unit 242 adjustably pushes the LIR module 230 for adjusting the relative positions between the LIR module 230 and the rod holder flat spring 220 in the first axis. The first adjusting unit 242 is an adjusting screw. Since the third surface S3 of the LIR module 230 leans on the first elastic component 222a, when the first adjusting unit 242 is tightened or released, the first elastic component 222a would get elastic deformation to enable the whole LIR module 230 to move up or down along the first axis, so that the vertical position of the LIR module 230 is changed.

The second adjusting unit 244 is for adjusting the relative position between the LIR module 230 and the rod holder flat spring 220 in the second axis. The second adjusting unit 244 mainly includes a fixed base 2441, a first wedge block 2442 and a second wedge block 2443. The fixed base 2441 is fixed on the engine base 210 and has a first position-limiting groove G1 and a second position-limiting groove G2 connected to the first position-limiting groove G1. The first wedge block 2442 is slideably disposed in the first position-limiting groove G1 of the fixed base 2441 and capable of moving along the first axis; the second wedge block 2443 is slideably disposed in the second position-limiting groove G2 of the fixed base 2441. The first wedge block 2442 leans on the second wedge block 2443, and an acute angle is formed between the contact surfaces of the first wedge block 2442 and the second wedge block 2443 and the first axis, so as to push and move the second wedge block 2443 in the second position-limiting groove G2 along the second axis. The second wedge block 2443 is suitable for pushing the LIR module 230 for adjusting the horizontal relative position between the LIR module 230 and the rod holder flat spring 220.

In more detail, the second adjusting unit 244 further includes an extended rod 2444. An end of the extended rod 2444 is fixed at the second wedge block 2443, and another end thereof passes through the fixed base 2441 and the second side wall 212 of the engine base 210 and leans against the second surface S2 of the LIR module 230. In this way, when the second wedge block 2443 moves along the second axis, the relative position between the LIR module 230 and the rod holder flat spring 220 in the second axis may be adjusted by using the extended rod 2444 to push the LIR module 230. Moreover, the second adjusting unit 244 further includes an elastic component 2445. The extended rod 2444 is inserted into the elastic component 2445. One end of the elastic component 2445 leans against the second wedge block 2443, and the other end thereof leans against the fixed base 2441. The elastic component 2445 provides the second wedge block 2443 with a restore force for springing back the second wedge block 2443 to an initial position thereof. Moreover, the second adjusting unit 244 further includes an adjusting component 2446, which passes through the fixed base 2441 and is suitable for pushing the first wedge block 2442 to move along the first axis. In more detail, the adjusting component 2446 is an adjusting screw.

The light valve (not shown) is disposed on the optical path of the light beam after passing through the LIR module 230 so as to convert an illumination beam into an image beam.

Figure 3:
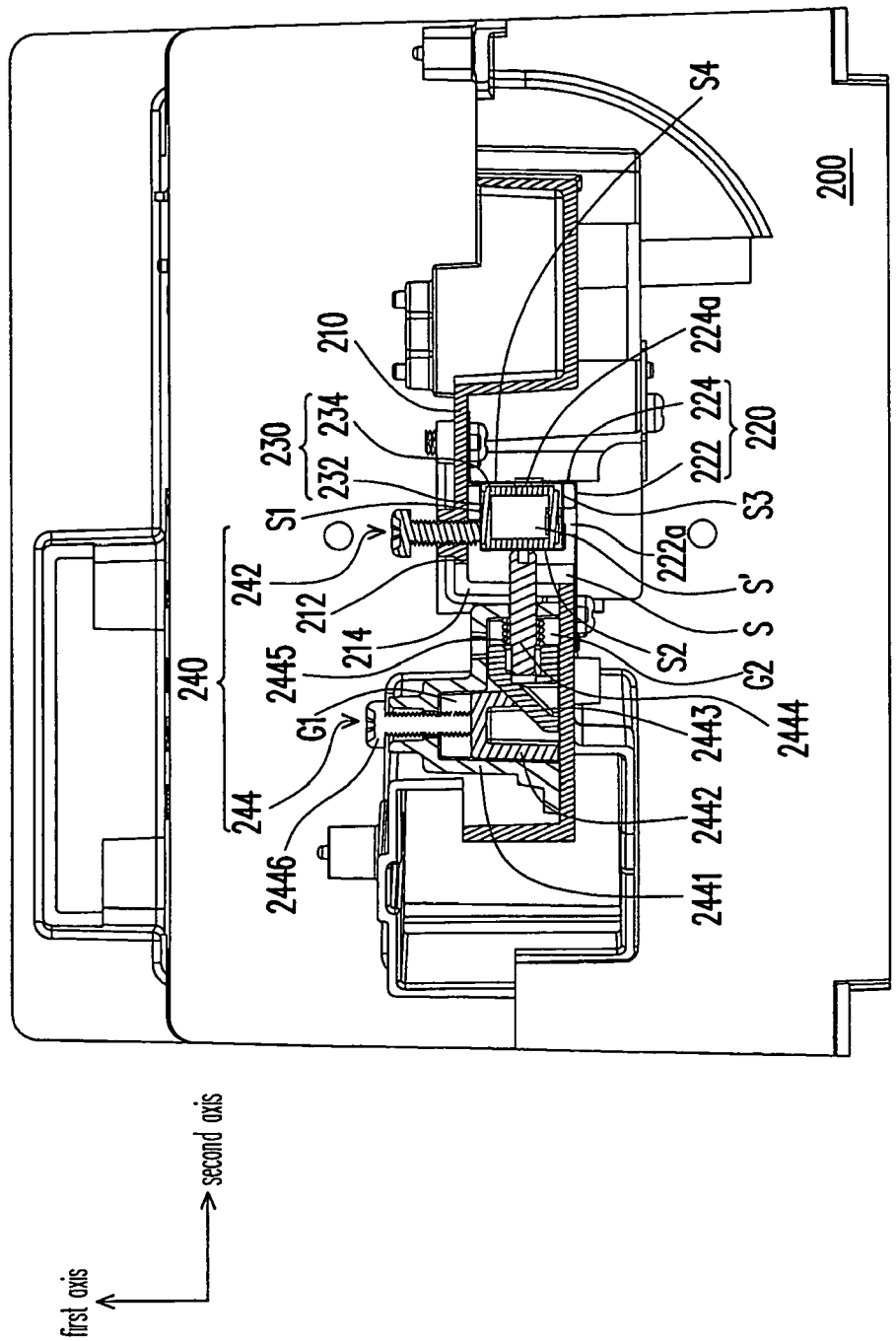
FIGS. 3 and 4 are sectional diagrams showing two different positions of an LIR module respectively corresponding to tightening down and loosening up the adjusting component thereof according to the present invention.
Figure 4:
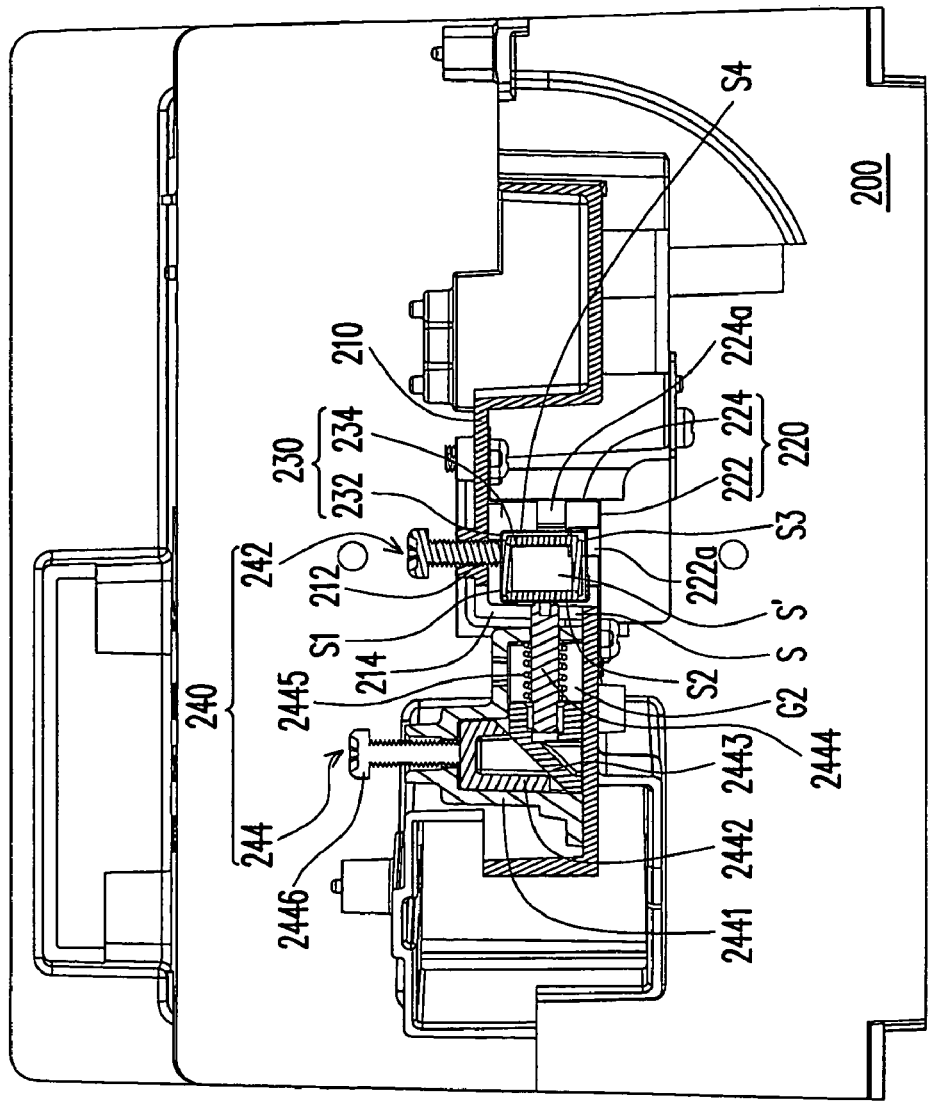

FIGS. 3 and 4 are cross-sectional diagrams showing an operator changes the horizontal position of the LIR module 230 by screwing the adjusting component 2446. Referring to FIG. 3, when the operator screws tight the adjusting component 2446, one end of the adjusting component 2446 comes in contact with the first wedge block 2442 to force the first wedge block 2442 downward. Then, the first wedge block 2442 moving downward exerts an horizontal force component on the second wedge block 2443 to push the second wedge block 2443 to move to the right in the second position-limiting groove G2. At the time, the second wedge block 2443 drives the extended rod 2443 to move to the right, which further pushes the whole LIR module 230 to move to the right. At this time, the second spring portion 224a and the elastic component 2445 are compressed.

Referring to FIG. 4, when the adjusting component 2446 is released, the restore force of the second spring portion 224a pushes the LIR module 230 to the left; meanwhile, the restore force of the elastic component 2445 enables the adjusting component 2446 to spring back to the initial position thereof.

Figure 5:
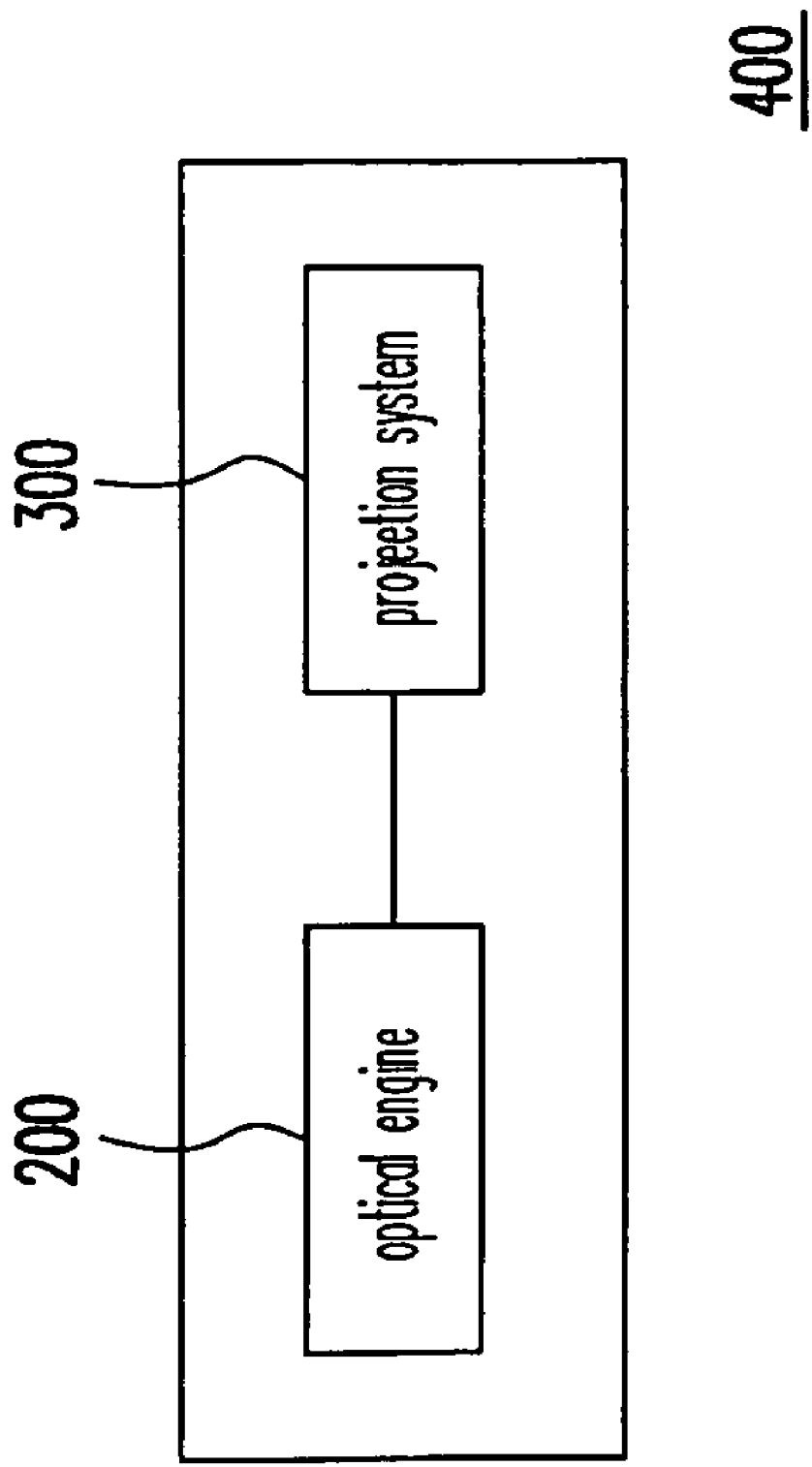
FIG. 5 is a block diagram of a projection apparatus employing the optical engine shown by the FIGS. 2A-2C.

FIG. 5 is a block diagram of a projection apparatus employing the optical engine shown in the FIGS. 2A-2C. Referring to FIG. 5, a projection apparatus 400 of the present embodiment includes an above-mentioned optical engine 200 and a projection system 300. The optical engine 200 suitable for converting the light beam provided by the light source into an image and the projection system 300 is disposed on the transmission path of the image to project the image onto a screen. The structure of the optical engine 200 has been discussed as the above-mentioned, and is not repeated herein. In addition, the optical engine 200 includes a digital image projection system, a liquid crystal projection apparatus or a monocrystalline-silicon LCD.

In summary, the adjusting mechanism of the LIR module provided by the present invention utilizes two wedge blocks moving in perpendicular directions to convert the vertical adjustment of horizontal adjusting component into horizontal adjustment of an LIR module. Therefore, the horizontal adjusting component and the vertical adjusting component are able to be assembled on the engine base along the same direction. In this way, an operator can adjust the horizontal position and the vertical position of the LIR module from the same side of the projection apparatus, which increases the convenience of adjusting both the horizontal position and the vertical position of the LIR module.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An adjusting mechanism, suitable for an optical engine having an engine base, a light integration rod module and a rod holder flat spring fixed on the engine base, wherein the engine base has a first side wall and a second side wall adjacent to the first side wall, the rod holder flat spring has a third side wall and a fourth side wall adjacent to the third side wall, the first side wall, the second side wall, the third side wall and the fourth side wall form an accommodating space for receiving the light integration rod module, and a first spring portion and a second spring portion are respectively disposed on the third side wall and the fourth side wall, the adjusting mechanism comprising:

a first adjusting unit, passing through the first side wall of the engine base and adjustably pushing the light integration rod module to adjust the relative position between the light integration rod module and the rod holder flat spring in a first axis; and a second adjusting unit for adjusting the relative position between the light integration rod module and the rod holder flat spring in a second axis substantially perpendicular to the first axis, the second adjusting unit comprising:

a fixed base, fixed on the engine base and having a first position-limiting groove and a second position-limiting groove connected to the first position-limiting groove;

a first wedge block, slideably disposed in the first position-limiting groove of the fixed base and capable of moving along the first axis; and a second wedge block, slideably disposed in the fixed base, wherein the first wedge block is adapted for pushing the second wedge block to move in the second position-limiting groove along the second axis, and the second wedge block is adapted for pushing the light integration rod module so as to adjust the relative position between the light integration rod module and the rod holder flat spring in the second axis.

2. The adjusting mechanism according to claim 1, wherein the light integration rod module comprises a frame and a light integration rod, the frame forms an accommodating space and the light integration rod is disposed in the accommodating space.

3. The adjusting mechanism according to claim 1, wherein the first adjusting unit is an adjusting screw.

4. The adjusting mechanism according to claim 1, wherein the second adjusting unit further comprises an adjusting component passing through the fixed base and adapted for pushing the first wedge block to move along the first axis.

5. The adjusting mechanism according to claim 4, wherein the adjusting component is an adjusting screw.

6. The adjusting mechanism according to claim 1, wherein an acute angle is formed between the first axis and the contact surfaces of the first wedge block and the second wedge block.

7. The adjusting mechanism according to claim 1, wherein the second adjusting unit further comprises an extended rod, wherein one end of the extended rod is fixed at the second wedge block, and the other end of the extended rod passes through the fixed base and the second side wall, and leans against the light integration rod module, and the extended rod is adapted for pushing the light integration rod module to adjust the relative position between the light integration rod module and the rod holder flat spring in the second axis.

8. The adjusting mechanism according to claim 7, wherein the second adjusting unit further comprises an elastic component, and the extended rod inserted into the elastic component, one end of the elastic component leaning against the second wedge block, and the other end thereof leaning against the fixed base.

9. An optical engine, comprising:

a light source, adapted for providing a light beam;

an engine base having a first side wall and a second side wall adjacent to the first side wall;

a rod holder flat spring fixed on the engine base and having a third side wall and a fourth side wall adjacent to the third side wall, wherein the first side wall, the second side wall, the third side wall and the fourth side wall form an accommodating space, and a first spring portion and a second spring portion are respectively disposed on the third side wall and the fourth side wall;

a light integration rod module, disposed in the accommodating space to homogenize the light beam, wherein the light integration rod module leans on the first spring portion and the second spring portion;

an adjusting mechanism, adapted for adjusting the relative position between the light integration rod module and the rod holder flat spring in a first axis and a second axis substantially perpendicular to the first axis, the adjusting mechanism comprising:

a first adjusting unit, passing through the first side wall of the engine base and adjustably pushing the light integration rod module to adjust the relative position between the light integration rod module and the rod holder flat spring in the first axis; and a second adjusting unit for adjusting the relative position between the light integration rod module and the rod holder flat spring in the second axis, the second adjusting unit comprising:

a fixed base; fixed on the engine base and having a first position-limiting groove and a second position-limiting groove connected to the first position-limiting groove;

a first wedge block, slideably disposed in the first position-limiting groove of the fixed base and capable of moving along the first axis; and a second wedge block, slideably disposed in the fixed base, wherein the first wedge block is adapted for pushing the second wedge block to move in the second position-limiting groove along the second axis, and the second wedge block is adapted for pushing the light integration rod module so as to adjust the relative position between the light integration rod module and the rod holder flat spring in the second axis; and a light valve, disposed on an optical path of the light beam after passing through the light integration rod module for converting the light beam into an image beam.

10. The optical engine according to claim 9, wherein the light integration rod module comprises a frame and a light integration rod, the frame forms an accommodating space and the light integration rod is disposed in the accommodating space.

11. The optical engine according to claim 9, wherein the first adjusting unit is an adjusting screw.

12. The optical engine according to claim 9, wherein the second adjusting unit further comprises an adjusting component passing through the fixed base and adapted for pushing the first wedge block to move along the first axis.

13. The optical engine according to claim 12, wherein the adjusting component is an adjusting screw.

14. The optical engine according to claim 9, wherein an acute angle is formed between the first axis and the contact surfaces of the first wedge block and the second wedge block.

15. The optical engine according to claim 9, wherein the second adjusting unit further comprises an extended rod, one end of the extended rod is fixed at the second wedge block, the other end of the extended rod passes through the fixed base and the second side wall and leans against the light integration rod module, and the extended rod is adapted for pushing the light integration rod module to adjust the relative position between the light integration rod module and the rod holder flat spring in the second axis.

16. The optical engine according to claim 15, wherein the second adjusting unit further comprises an elastic component, and the extended rod inserted into the elastic component, one end of the elastic component leaning against the second wedge block and the other end thereof leaning against the fixed base.

* * * * *